US00RE43262E

(19) United States
(12) Reissued Patent
June

(10) Patent Number: US RE43,262 E
(45) Date of Reissued Patent: Mar. 27, 2012

(54) RETAINING APPARATUS FOR USE IN A WELLHEAD ASSEMBLY AND METHOD FOR USING THE SAME

(75) Inventor: David R. June, Houston, TX (US)

(73) Assignee: Cameron International Corporation, Houston, TX (US)

(21) Appl. No.: 11/060,648

(22) Filed: Feb. 17, 2005

Related U.S. Patent Documents

Reissue of:
(64) Patent No.: 6,520,263
Issued: Feb. 18, 2003
Appl. No.: 09/861,426
Filed: May 18, 2001

(51) Int. Cl.
*E21B 33/035* (2006.01)
(52) U.S. Cl. ..... 166/368; 166/348; 166/86.1; 166/88.1
(58) Field of Classification Search ..... 166/368, 166/345, 348, 86.1, 88.1, 75.13
See application file for complete search history.

(56) References Cited

U.S. PATENT DOCUMENTS

| | | | | |
|---|---|---|---|---|
| 4,171,018 | A | 10/1979 | Walker | |
| 4,408,783 | A | 10/1983 | Gruller | 285/3 |
| 4,641,708 | A | 2/1987 | Wightman | |
| 4,665,979 | A | 5/1987 | Boehm, Jr. | |
| 4,691,780 | A | 9/1987 | Galle, Jr. et al. | |
| 4,842,307 | A | 6/1989 | Sweeney et al. | |
| 4,919,454 | A | 4/1990 | Caulfield et al. | |
| 5,076,356 | A | 12/1991 | Reimert | |
| 5,145,006 | A | 9/1992 | June | |
| 5,247,997 | A | 9/1993 | Puccio | |
| 5,307,879 | A | 5/1994 | Kent | 166/382 |
| 5,450,905 | A * | 9/1995 | Brammer et al. | 166/348 |
| 5,465,794 | A | 11/1995 | McConaughy et al. | |
| 5,555,935 | A * | 9/1996 | Brammer et al. | 166/88.1 |

(Continued)

FOREIGN PATENT DOCUMENTS

BR 0209866 6/2004

(Continued)

OTHER PUBLICATIONS

Cameron Iron Works, Inc.; *Marine Wellhead;* (p. 1046); 1986; (1 p.).

(Continued)

*Primary Examiner* — Thomas Beach
*Assistant Examiner* — Matthew Buck
(74) *Attorney, Agent, or Firm* — Conley Rose, P.C.

(57) ABSTRACT

A retaining apparatus, in particular an internal tree cap, for use in a wellhead having a central bore and first and second retaining means, such as a shoulder and a groove, within the bore of the wellhead. The retaining apparatus has a housing for location within the bore of the wellhead. A first engagement assembly is provided for engaging with the first retaining means in the bore of the wellhead to thereby retain the housing within the bore of the wellhead. A second engagement assembly for engaging with the second retaining means in the bore of the wellhead is also provided. The apparatus further comprises a preload assembly operable when the housing is located within the bore of the wellhead to apply a preload to the housing between the first and second retaining means. A method for retaining an assembly within a wellhead bore, in which a preload is applied between the first and second retaining means, is also disclosed.

58 Claims, 4 Drawing Sheets

U.S. PATENT DOCUMENTS

| | | | | |
|---|---|---|---|---|
| 5,575,336 | A * | 11/1996 | Morgan | 166/330 |
| 5,988,282 | A | 11/1999 | Jennings et al. | 166/348 |
| 5,992,527 | A | 11/1999 | Garnham et al. | |
| 6,039,119 | A | 3/2000 | Hopper et al. | |
| 6,050,339 | A | 4/2000 | Milberger | 166/368 |
| 6,062,314 | A * | 5/2000 | Nobileau | 166/368 |
| 6,302,212 | B1 | 10/2001 | Nobileau | |
| 6,367,551 | B1 * | 4/2002 | Fenton | 166/345 |
| 6,378,613 | B1 | 4/2002 | Kent et al. | |
| 6,675,900 | B2 * | 1/2004 | Baskett et al. | 166/379 |
| 6,763,891 | B2 * | 7/2004 | Humphrey et al. | 166/368 |
| 6,810,954 | B2 * | 11/2004 | Garrett et al. | 166/77.51 |
| 6,907,932 | B2 * | 6/2005 | Reimert | 166/341 |
| 2006/0231248 | A1 * | 10/2006 | Ford | 166/89.1 |
| 2008/0230229 | A1 * | 9/2008 | Shaw et al. | 166/368 |

FOREIGN PATENT DOCUMENTS

| | | |
|---|---|---|
| GB | 2394743 | 5/2004 |
| WO | WO 02/095185 | 11/2002 |

OTHER PUBLICATIONS

McEvoy-Willis; "Z-1"™; Wellhead System; (p. 4571); (undated).

McEvoy-Willis; "Z-1"™; *Subsea Completion Systems;* (p. 4579); (undated).

FMC; *Subsea Drilling and Completion;* (p. 2029-2034) (undated).

Hughes; *Production System;* (p. 3008); (undated).

Hughes; *15,000 PSI W.P. Wellhead System Type MS-1;* (p. 2982-2983) (undated).

Cooper Oil Tool; *Drill Through Mudline Wellhead System;* brochure; (1991-1995).

Cameron Iron Works, Inc.; Subsea Chokes—Diverless, Remotely Operated, Retrievable Choke Package (p. 1602), (1984) (1p.).

* cited by examiner

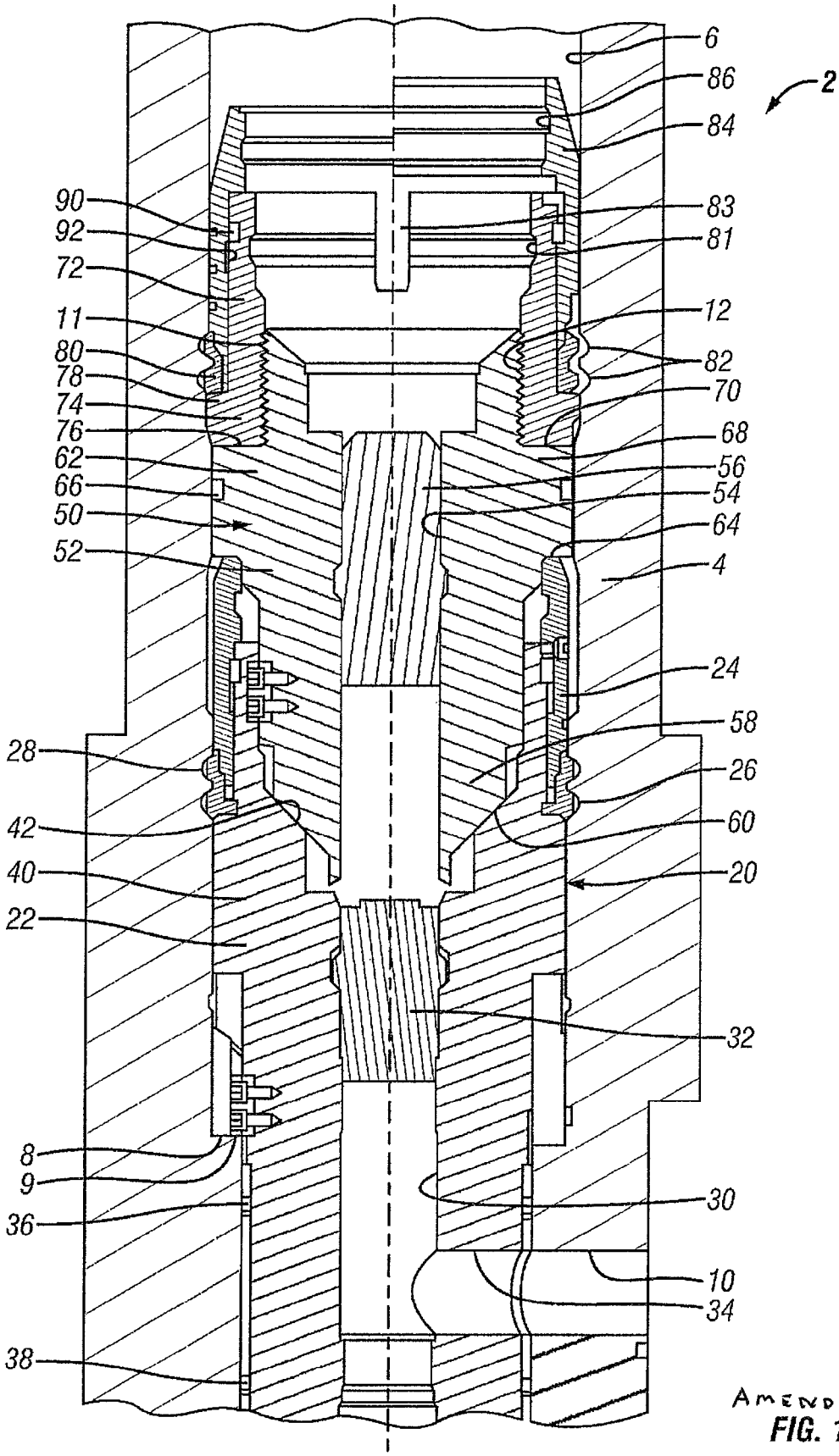
AMENDED
FIG. 1

RETAINING APPARATUS FOR USE IN A WELLHEAD ASSEMBLY AND METHOD FOR USING THE SAME

Matter enclosed in heavy brackets [ ] appears in the original patent but forms no part of this reissue specification; matter printed in italics indicates the additions made by reissue.

TECHNICAL FIELD OF THE INVENTION

The present invention relates to an apparatus for retaining assemblies, such as a tubing hanger, in a wellhead assembly and to a method for using the same. The present invention relates particularly to the apparatus in the form of an internal tree cap for use in a spool tree.

BACKGROUND OF THE INVENTION

A wellhead assembly, such as that employed on the seabed for offshore drilling and production operations, will often comprise an apparatus for retaining equipment and assemblies within the wellhead. An example of such a device is an internal tree cap. Internal tree caps typically comprise a housing for location within the bore of the wellhead assembly. The internal tree cap further comprises an assembly for engaging a suitable means within the wellhead. Suitable means within the bore of the wellhead to be engaged by the internal tree cap include one or more circumferential internal grooves and one or more internal seats or shoulders. Internal tree caps are employed within a wellhead assembly to retain assemblies and equipment. For example, internal tree caps can be employed to retain one or more plugs, such as a wireline plug, to close the central bore of the wellhead assembly. One or more seals are typically disposed between the tree cap and the inner wall of the wellhead assembly. One common location for internal tree caps is within the central bore of a spool tree forming part of the wellhead assembly.

In a further application, an internal tree cap is employed to retain a casing or tubing hanger within the wellhead. Within a well, casings or tubings are installed suspended from a hanger. The hanger is typically landed within the bore of the wellhead assembly against a shoulder. The hanger assembly typically comprises one or more seals to seal against the inner wall of the wellhead assembly. The hanger assembly may comprise one or more assemblies for engaging with the wellhead, for example with one or more circumferential grooves formed in the inner wall of the wellhead assembly.

It has been found that, in use, movement of such devices as internal tree caps and tubing hangers within the bore of the wellhead assembly after installation causes rapid wear of the seals between the respective devices and the inner wall of the wellhead assembly to occur. This in turn leads to a loss in the integrity of the seal.

U.S. Pat. No. 4,408,783 discloses a holddown apparatus for retaining a casing or tubing hanger within a wellhead assembly. The holddown apparatus is mounted on the tubing hanger. The hanger is provided with a shoulder for engaging with a seat in the bore of the wellhead assembly. The holddown assembly comprises a radially expansible locking ring having an upwardly facing tapered surface. An annular cam ring is provided having a corresponding tapered surface to engage with the tapered surface of the locking ring and is threadingly engaged with the hanger. When the hanger and holddown apparatus are located within the wellhead assembly, the locking ring is positioned opposite a circumferential groove in the wall of the wellhead bore. The cam ring is rotated by a running tool and is caused to move against the locking ring moving it into engagement with the inner groove of the wellhead assembly. Removal of the hanger is only possible once the cam ring is rotated in the opposite direction, moving it out of engagement with the locking ring, in turn allowing the locking ring to release from the internal groove of the wellhead assembly. In this way, the holddown apparatus retains the hanger locked within the wellhead assembly. Due to imprecision in the forming of the locking ring and the inner groove of the wellhead assembly, relative movement between the hold-down and hanger apparatus and the wellhead can occur. As discussed above, this leads to a rapid wearing of the seals acting between the hanger assembly and the inner wall of the wellhead.

U.S. Pat. No. 5,307,879 discloses a casing or tubing hanger assembly having a lockdown apparatus for locking the seal of the hanger against the inner wall of wellhead assembly into which the hanger is installed. The lockdown apparatus includes a split lock ring which is movable radially into and out of engagement with a circumferential groove in the wall of the inner bore of the wellhead assembly. A wedge ring is provided for vertical movement. Downwards movement of the wedge ring brings it into contact with the segments of the lock ring, which action moves the lock ring into engagement with the inner groove of the wellhead. Once the lock ring is engaged, the hanger assembly is retained in the wellhead bore. Further downward movement of the wedge ring is provided, which acts to set the seal, once the lock ring is in full engagement with the groove of the wellhead. This further movement is provided by allowing the wedge, ring to partially deform under the action of continued applied downwards force once the lock ring is fully engaged. Again, even though the lock ring of the assembly of U.S. Pat. No. 5,307,879 may fully engage in the internal groove of the wellhead, vertical movement of the lockdown apparatus and the hanger assembly is possible, leading to the rapid wear of the seals discussed above.

It can be seen, therefore, that there is a need for an improved manner of securing and retaining assemblies, such as tubing or casing hangers, within the bore of a wellhead, such that relative vertical movement of the assembly with respect to the wellhead assembly is prevented.

U.S. Pat. No. 5,145,006 discloses a tubing hanger and running tool with preloaded lockdown. The hanger lands on a seat within a subsea wellhead housing. A locking means is provided on the hanger to engage an interior recess in the wellhead housing. A preloading means includes an extendible ring cooperating with the locking means to provide a preload to the hanger and prevent movement of the hanger within the housing.

A tubing hanger has a very specific use within a wellhead assembly, that is the support and retention of tubing extending within the well. A tubing hanger is a complex item of equipment. In keeping with this complexity, it has been found that it can be difficult to provide the tubing hanger itself with the preload means, as well as retain the other features of the hanger necessary for it to function properly. Accordingly, an improved device is required that may be applied within a wellhead, for example to secure a tubing hanger, as well as a range of other apparatus within a wellhead housing, in such a way that relative movement between the device, together with any apparatus it is retaining, and the wellhead housing is prevented.

SUMMARY OF THE INVENTION

According to a first aspect of the present invention, there is provided a retaining apparatus for use in a wellhead, the wellhead having a central bore and first and second retaining means within the bore of the wellhead, the apparatus comprising:

a housing for location within the bore of the wellhead;

a first engagement assembly for engaging with the first retaining means in the bore of the wellhead to thereby retain the housing within the bore of the wellhead;

a second engagement assembly for engaging with the second retaining means in the bore of the wellhead;

a preload assembly operable when the housing is located within the bore of the wellhead to apply a preload to the housing between the first and second retaining means.

The apparatus of the present invention is retained in the bore of the wellhead assembly in a manner such as to prevent longitudinal movement of the apparatus and any other wellhead components retained by the apparatus within the bore. The application of the preload to the apparatus after its initial installation serves to lock the apparatus in place and prevent the aforementioned movement. By preventing such movement, the problems and shortcomings discussed above are overcome. In particular, the rapid wear of the seals in place between the apparatus and the inner wall of the wellhead assembly is prevented, in turn preventing premature failure of the seals. In addition, it has been found that components of the wellhead assembly introduced into the central bore through horizontal ports, for example electrical and hydraulic control lines, suffer from rapid wear and failure due to vertical movement of components, such as casing or tubing hangers, in the central bore. Again, by eliminating the vertical movement of the components within the wellhead bore, the poor performance and failure of equipment introduced horizontally into the wellhead bore can be prevented.

Suitable assemblies for use as the first retaining means within the wellhead bore are known in the art and include such arrangements as one or more circumferential grooves in the inner wall of the wellhead assembly. The first retaining means within the bore of the wellhead preferably comprises an internal shoulder within the bore. In this case, the first engagement assembly is most conveniently a shoulder provided on the housing for seating directly or indirectly on the wellhead shoulder. By direct seating is meant that the shoulder of the housing is in direct contact with the internal shoulder of the wellhead assembly. The shoulder of the housing may seat indirectly on the internal wellhead shoulder when one or more wellhead components, such as one or more casing hangers, are installed between the retaining apparatus and the internal shoulder. In such a case, the shoulder of the housing seats against the or the uppermost intermediate component. In such an arrangement however, the internal shoulder of the wellhead still acts to retain the housing of the apparatus.

As the second retaining means the wellhead may comprise any suitable assembly known in the art. Preferably, the second retaining means comprises a circumferential groove within the bore of the wellhead. In such a case, the second engagement assembly is of a form to engage with the circumferential groove, most conveniently comprising a locking ring engageable with the circumferential groove. To operate the second engagement assembly, the apparatus may comprise an actuator movable between a first position in which the actuator is disengaged from the locking ring to a second position in which the actuator is engaged with the locking ring, movement of the actuator from the first position to the second position when the apparatus is positioned within the wellhead engaging the locking ring with the circumferential groove. Preferably, the actuator is a collar moveable longitudinally with respect to the housing. In one embodiment, the collar comprises a tapered surface, movement of the collar from the second position to the first position bringing the tapered surface into contact with the second engagement assembly and thereafter urge the second engagement assembly into engagement with the circumferential groove.

In the apparatus, the first and second engagement assemblies are spaced apart. The preload arises from the action of the preload assembly urging the first and second engagement assemblies into a position of greater separation, thus generating a force or preload between the two. This serves to secure the apparatus within the bore of the wellhead assembly and prevent its movement. The preload assembly preferably comprises a loading member movable so as to be brought to bear against the second engagement assembly once the second engagement assembly is engaged with the first retaining means, to urge the apparatus towards the first retaining means within the wellhead and, thereby, provide the preload. In one embodiment, the loading member is a loading ring movable longitudinally with respect to the housing. In one convenient arrangement, a threaded connection secures the loading ring to the housing, rotation of the loading ring with respect to the housing causing the loading ring to move longitudinally with respect to the housing.

As already noted, generally, casing or tubing hangers tend to be complex components, causing difficulty in providing means in the hanger to apply the preload. Accordingly, the apparatus of the present invention is provided as a separate wellhead component, in order to apply the preload to other wellhead components, such as casing or tubing hangers, indirectly. It has been found that the apparatus performs very well as an internal tree cap, in particular an internal tree cap arranged to be landed and secured within a spool tree in the wellhead assembly. As noted above, the internal tree cap may be arranged to be landed directly on a retaining means, such as an internal shoulder, within the bore of the spool tree. In this arrangement, the internal tree cap will apply a preload to itself to be retained within the wellhead housing. An example of when such an installation is of use is when horizontal control lines are provided in the wellhead assembly to extend through the housing and into the internal tree cap itself.

Alternatively, the internal tree cap may be arranged to land on a casing or tubing hanger, which in turn is landed directly on a retaining means within the wellhead spool tree.

In a further aspect, the present invention provides a method for retaining an apparatus within the central bore of a wellhead assembly, the method comprising:

providing a first retaining means within the bore of the wellhead assembly;

providing a second retaining means within the bore of the wellhead assembly;

providing the apparatus with an engagement assembly for engaging with the second retaining means within the bore of the wellhead assembly;

positioning the apparatus within the bore of the wellhead assembly so as to be retained by the first retaining means;

engaging the engagement assembly with the second retaining means;

applying a preload to the apparatus against the second retaining means to urge the apparatus toward the first retaining means.

As discussed above, the first retaining means is preferably an internal shoulder formed within the central bore of the wellhead assembly. The apparatus may be landed directly on the internal shoulder within the central bore of the wellhead. Alternatively, the method may comprise first landing a wellhead component, such as a casing or tubing hanger, within the central bore of the wellhead assembly so as to be retained by the first retaining means, the apparatus thereafter being landed directly on the wellhead component.

In one preferred embodiment, the second retaining means within the bore of the wellhead assembly comprises a circumferential groove, the apparatus being provided with an engagement ring movable radially into and out of engagement with the circumferential groove once the apparatus is positioned within the central bore of the wellhead assembly. Preferably, the method further comprises providing an actuator movable longitudinally within the central bore of the wellhead assembly, movement of the actuator in a first direction causing the engagement ring to move into engagement with the groove and movement of the actuator in a second direction causing the engagement ring to move out of engagement with the groove. To install the apparatus in the wellhead bore, the method comprises moving the actuator in the first direction to cause the engagement ring to engage with the groove.

To apply the preload, the apparatus is preferably provided with a loading assembly, the loading assembly being movable longitudinally within the bore of the wellhead assembly, with the apparatus positioned within the bore of the wellhead assembly and the engagement assembly engaged with the second retaining means, movement of the loading assembly in a first direction causing the loading assembly to bear against the second retaining means and urge the apparatus against the first retaining means, thereby applying the preload to the apparatus. To fully install the apparatus in the wellhead bore, the method includes moving the loading assembly in the first direction to bear against the second retaining means and thus apply the desired amount of preload.

In a preferred embodiment, in which the apparatus comprises a housing, movement of the loading assembly in the first direction is obtained by rotation of the loading assembly with respect to the housing, the housing and the loading assembly being connected, for example, by means of a threaded connection allowing the necessary relative rotation.

In a further aspect, the present invention provides an internal tree cap for installation in the central bore of a wellhead assembly, the wellhead assembly comprising first and second retaining means within the bore of the wellhead, the internal tree cap comprising:

a cap housing for location within the bore of the wellhead;

a first engagement assembly for engaging with the first retaining means in the bore of the wellhead to thereby retain the cap housing within the bore of the wellhead;

a second engagement assembly for engaging with the second retaining means in the bore of the wellhead;

a preload assembly operable when the cap housing is located within the bore of the wellhead, the preload assembly when operated bearing against the second retaining means to urge the cap housing towards the first retaining means, the preload assembly thereby applying a preload to the cap housing between the first and second retaining means.

In still a further aspect, the present invention provides a wellhead assembly comprising:

first and second retaining means within the bore of the wellhead;

an internal tree cap retained in the bore of the wellhead, the internal tree cap comprising:

a cap housing for location within the bore of the wellhead;

a first engagement assembly for engaging with the first retaining means in the bore of the wellhead to thereby retain the cap housing within the bore of the wellhead;

a second engagement assembly for engaging with the second retaining means in the bore of the wellhead;

a preload assembly operable when the cap housing is located within the bore of the wellhead, the preload assembly when operated bearing against the second retaining means to urge the cap housing towards the first retaining means, the preload assembly thereby applying a preload to the cap housing between the first and second retaining means.

The wellhead assembly may further comprise a spool tree, the internal tree cap being retained in the central bore of the spool tree. In many cases, the wellhead assembly will comprise a tubing hanger, the tubing hanger being retained in the bore of the wellhead assembly by the first retaining means, the first engagement assembly of the internal tree cap engaging with the tubing hanger to retain the internal tree cap within the bore of the wellhead assembly.

Specific embodiments of the apparatus and method of the various aspects of the present invention will now be described in detail having reference to the accompanying drawings. The detailed description of these embodiments and the referenced drawings are by way of example only and are not intended to limit the scope of the present invention.

BRIEF DESCRIPTION OF THE DRAWINGS

Preferred embodiments of the present invention will now be described, by way of example only, having reference to the accompanying drawings, in which:

FIG. 1 is a longitudinal cross-sectional view of a retaining apparatus according to a first embodiment of the present invention installed on a tubing hanger within a spool tree of a wellhead assembly, the right hand portion of FIG. 1 showing the apparatus in place in the spool tree in the disengaged state and the left hand portion of FIG. 1 showing the apparatus in place in the spool tree in the engaged state;

DETAILED DESCRIPTION OF THE PREFERRED EMBODIMENTS

Figure 2:
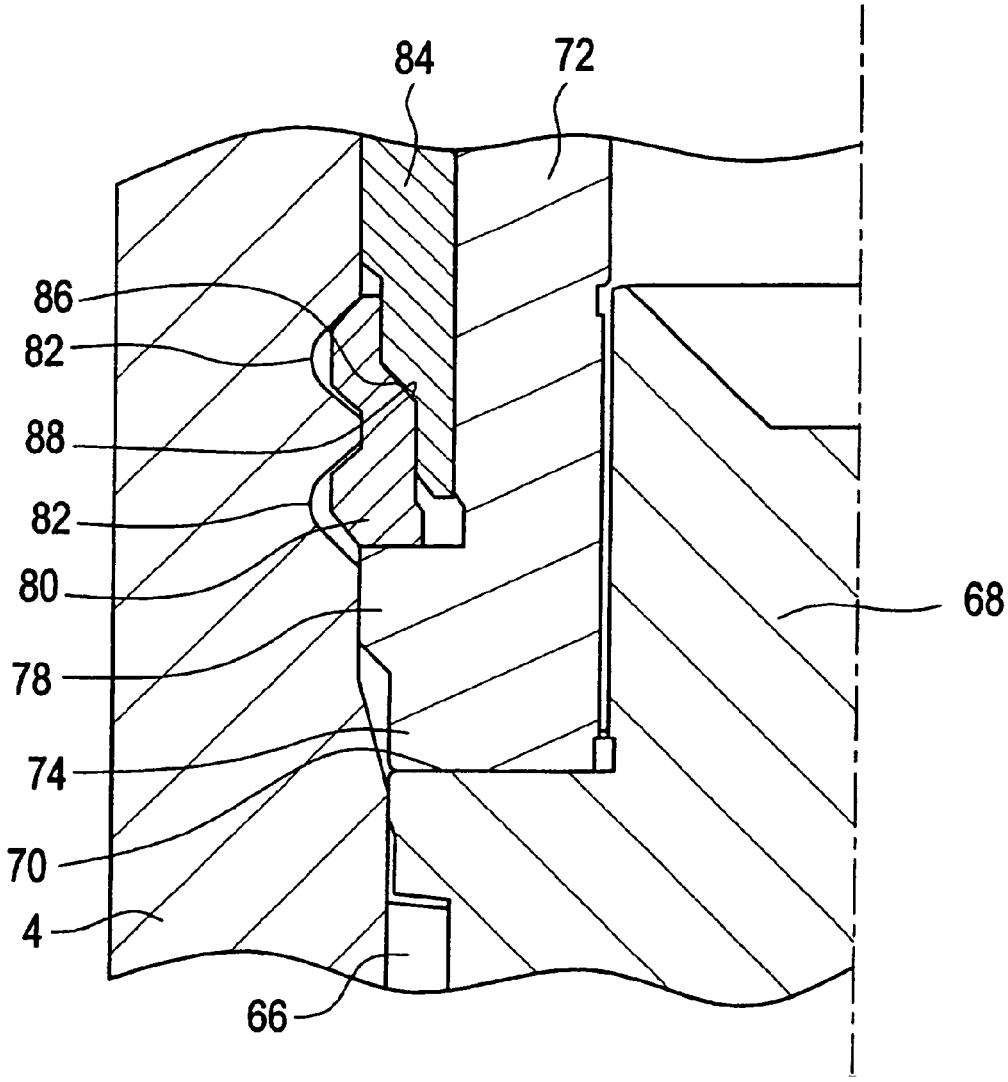
FIG. 2 is an enlarged cross-sectional view of a portion of the retaining apparatus and spool tree of FIG. 1, with the retaining apparatus installed before the application of preload to the retaining apparatus.

Referring to FIG. 1, a wellhead or spool tree assembly, generally indicated as 2, comprises a spool tree 4. The spool tree 4 is of conventional design and is installed on the wellhead in a conventional manner by conventional means, omitted from FIG. 1 for the purposes of clarity. The spool tree 4 comprises a longitudinal central bore 6. The spool tree 4 is formed with a circumferential shoulder 8 extending into the central bore 6. A radial bore. 10 extends through the spool tree 4 and opens into the central bore 6 of the spool tree 4 below the shoulder 8. The radial bore 10 provides access to or egress from the central bore 6 of the wellhead assembly 2.

A tubing hanger, generally indicated as 20, is positioned within the central bore 6 of the spool tree 4. The tubing hanger 20 comprises a generally tubular hanger body 22 seated directly on the shoulder 8 of the spool tree 4 in a conventional manner, either with or without landing rings. *In some embodi-*

*ments, as illustrated by FIG. 1, tubular hanger body 22 has a shoulder 9 that seats directly on the shoulder 8 of the spool tree 4.* An annular pack-off 24 of conventional design seals the upper end of the hanger body 22 to the inner wall of the spool tree 4. The pack-off 24 comprises a locking ring 26, engaged with a pair of circumferential grooves 28 in the inner wall of the spool tree 4. The locking ring 26 serves to retain the tubing hanger 20 in position with the hanger body 22 seated on the shoulder 8 of the spool tree 4. The locking ring 26 is a loose fit in the circumferential grooves 28 in the inner wall of the spool tree 4, allowing the tubing hanger 20 limited movement longitudinally within the central bore 6 of the spool tree 4. The tubing hanger 20 has a longitudinal central bore 30, in which is fitted a wireline plug 32 of conventional design. A lateral bore 34 extends through the hanger body 22 below the wireline plug 32. The lateral bore 34 opens at a first end into the central bore 30 of the tubing hanger 20. The second end of the lateral bore 34 is aligned with the radial bore 10 in the spool tree 4. Upper and lower circumferential seals 36 and 38 extend between the hanger body 22 and the inner wall of the spool tree 4 above and below the lateral bore 34 respectively.

The upper portion 40 of the hanger body 22 (as oriented within the spool tree 4 and shown in FIG. 1) has a tapered surface 42, forming a seat on which may be landed further wellhead components and equipment.

An internal tree cap, generally indicated as 50, is shown positioned above the tubing hanger 20 in FIG. 1. The internal tree cap comprises a generally tubular cap housing 52, having a central longitudinal bore 54. A wireline plug 56 of conventional design is shown in FIG. 1 installed in the central bore 54 of the cap housing 52. The lower end portion 58 of the cap housing 54 (as the cap is oriented within the spool tree 4 and shown in FIG. 1) has a tapered surface 60. The tapered surface 60 corresponds with the tapered surface 42 on the upper portion 40 of the hanger body 22, allowing the cap housing 52 to seat on the hanger body 22. The upper end portion 62 of the cap housing 52 has a diameter substantially the same as that of the inner bore 6 of the spool tree 4. The upper end portion 62 of the cap housing 52 terminates at its lower end in a shoulder 64. With the internal tree cap 50 positioned in the spool tree 4 as shown in FIG. 1, the shoulder 64 seats on the upper end of the annular pack-off 24. A seal 66 is seated in a groove formed in the outer surface of the upper end portion 62 of the cap housing 52 and provides a fluid tight seal between the cap housing 52 and the inner wall of the spool tree 4. The seal 66 is typically a metal seal, although other forms of seal known in the art may also be employed.

The upper end portion 62 of the cap housing 52 terminates at its upper end in a neck 68, having a thread *11* formed on its outer surface. The neck 68 is of reduced diameter compared with the upper end portion 62 of the cap housing 52, leaving a shoulder 70 at the upper end of the cap housing 52. A generally tubular actuator ring 72 bears an internal thread *12* on its inner surface, allowing the actuator ring 72 to be threadingly secured to the neck 68 of the cap housing 52. The end portion 74 of the actuator ring 72 adjacent the cap housing is formed with a seating surface 76 allowing the actuator ring 72 to seat on the shoulder 70. The end portion 74 of the actuator ring 72 is formed with an upper shoulder 78. A split "C" locking ring 80 extends around the actuator ring 72 and rests on the shoulder 70 of the actuator ring 72. The locking ring 80 is formed to be engageable with a pair of locking grooves 82 formed in the inner wall of the spool tree 4. As an alternative to the split "C" ring, the locking ring 80 may be in the form of a segmented ring. The actuator ring 72 is formed with an internal circumferential groove 81 and a longitudinal slot 83, which together may be engaged by a suitable tool passed into the wellhead assembly in order to allow the actuator ring 72 to be rotated.

A generally cylindrical actuator collar 84 extends around the upper portion of the neck 68 on the upper end of the cap housing 52. A portion of the actuator collar 84 extending beyond the upper end of the neck 68 is formed with an internal circumferential groove 86, which may be engaged by a suitable tool passed into the wellhead assembly. The actuator collar 84 is slidable longitudinally with respect to the actuator ring 72 between a first, upper position, as shown in the right hand portion of FIG. 1, and a second, lower position, as shown in the left hand portion of FIG. 1. In the first position, the lower end of the collar 84 rests in contact with the upper edge of the locking ring 80. As shown in more detail in FIG. 2, the lower portion of the actuator collar 84 is formed with a tapered surface 86. Upon downwards movement of the actuator collar 84 from the first position to the second position, the tapered surface 86 of the actuator collar 84 engages with the locking ring 80 and urges it radially outwards into engagement with the locking grooves 82. Downwards movement of the actuator collar 84 is limited by the tapered surface 86 contacting a corresponding tapered surface 88 on the inner surface of the locking ring 80. Upwards movement of the actuator collar 84 beyond the first position is restricted by means of a retaining ring 90 seated in a groove in the upper portion of the actuator ring 72 and engaging with an interior groove 92 in the actuator collar 84.

Figure 3:
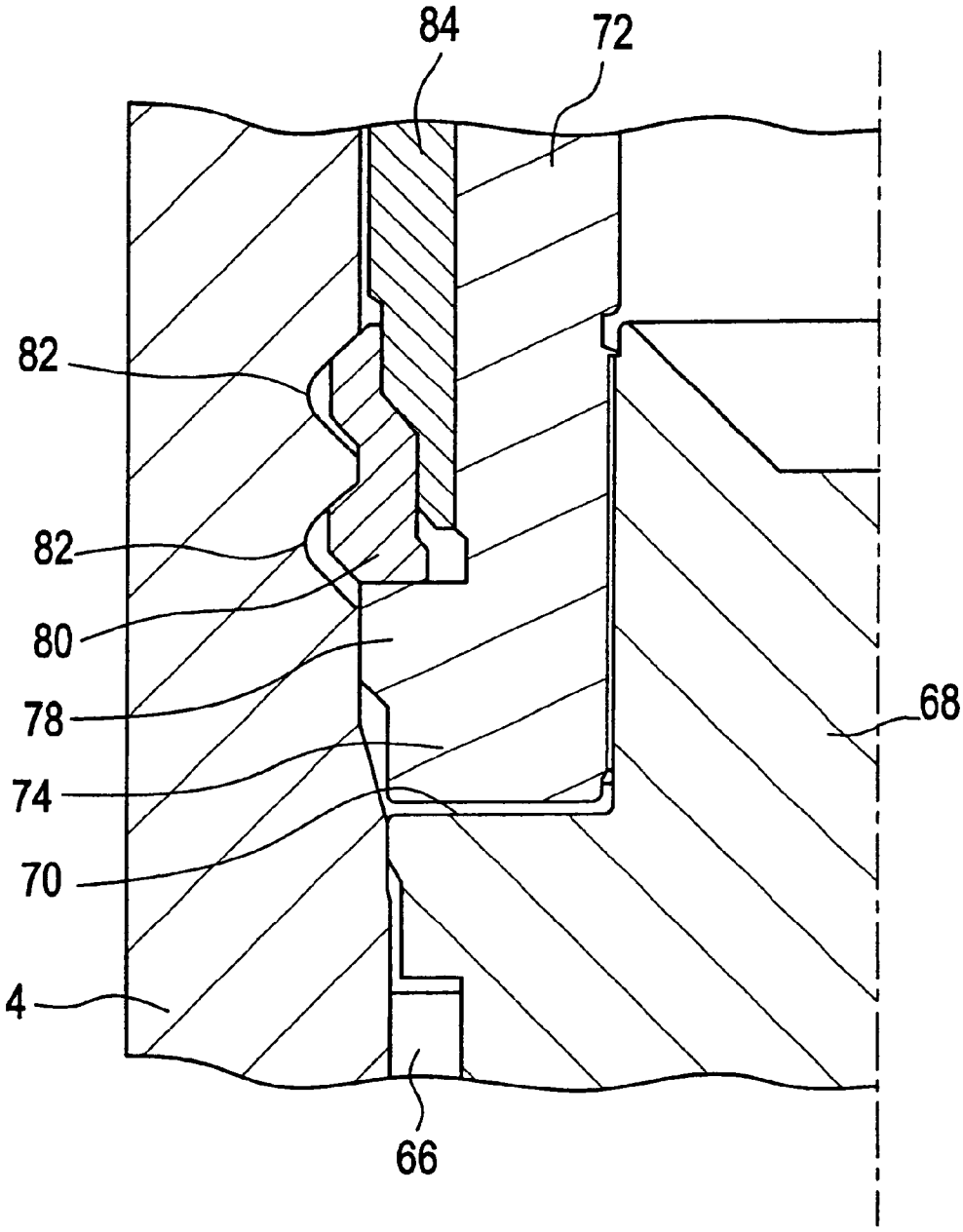
FIG. 3 is an enlarged cross-sectional view of a portion of the retaining apparatus of FIG. 1 as shown in FIG. 2, after the preload has been applied to the retaining apparatus.

In operation, the internal tree cap 50 is landed within a wellhead assembly, such as on a tubing hanger, retained by an internal form within the wellhead assembly, as shown in FIG. 1. A tool (not shown) is inserted into the wellhead bore 6 to engage with the groove 86 in the actuator collar 84 and move the actuator collar 84 from its first upper position shown in the right hand portion of FIG. 1 to its second lower position shown in the left hand portion of FIG. 1 and in FIG. 2. As seen more clearly from FIG. 2, in the second position, the locking ring 80 engages with the locking grooves 82 of the spool tree 4. However, as shown, the locking ring 80 is a loose fit within the grooves 82, which, while sufficient to retain the tree cap within the spool tree 4, allows a measurable movement of the internal tree cap in the longitudinal direction to occur. A similar phenomenon will occur with the locking ring 26 of the pack-off 24 and its engagement with the grooves 28. Thus, longitudinal movement of the entire tubing hanger 20 is also permitted. To effectively lock the entire tree cap and hanger assembly in place, a preload is applied against the shoulder 8 of the spool tree 4. To achieve this, a tool is pieced into the wellhead bore 6 to engage with the groove 81 and the slot 83 in the actuator ring 72. The tool rotates the actuator ring 72, raising it from its seat against the shoulder 70 of the upper end portion 62 of the cap housing 52 and bringing the upper shoulder 78 of the actuator ring 72 into contact with the lower edge of the locking ring 80. Continued rotation of the actuator ring 72 moves the locking ring 80 into contact with upper surface of each groove 82, as shown in FIG. 3. Further rotation of the actuator 72 applies a force against the locking ring 80 and the grooves 82, in turn forcing the internal tree cap 50 and the hanger 20 against the lower shoulder 8 of the spool tree 4. The force applied to the locking ring 80 and the grooves 82 may be varied by varying the extent of rotation of the actuator ring 72. With a sufficient force applied to the locking ring 80 in the position shown in FIG. 3, all play in the assembly is taken up and longitudinal movement is prevented. In this way, seals, such the seals 36, 38 and 66 are protected from premature wear and failure.

Removal of the internal tree cap 50 and the tubing hanger 20 may be effected by reversing the procedure described above. Alternatively, the internal tree cap 50 can be unlatched with sufficient overpull to overcome the friction between the locking ring 80, the actuator collar 84 and the actuator ring 72. If unlatched in such a manner, the actuator ring 72 would not need to be rotated in the reverse direction.

Figure 4:
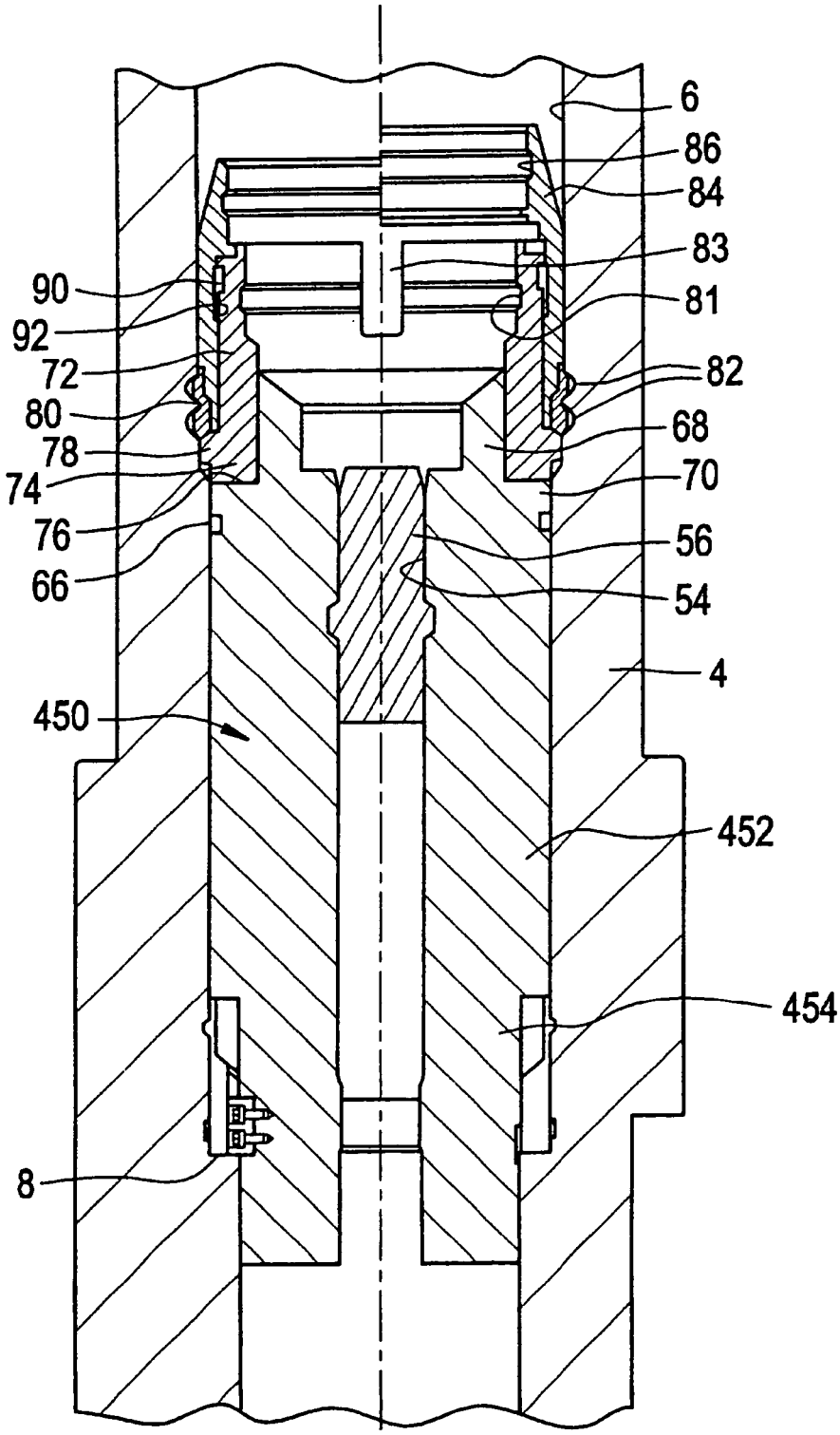
FIG. 4 is a longitudinal cross-sectional view of a retaining apparatus according to a second embodiment of the present invention installed within a spool tree of a wellhead assembly, the right-hand portion of FIG. 4 showing the apparatus in place in the spool tree in the disengaged state and the left band portion of FIG. 4 showing the apparatus in place in the spool tree in the engaged state.

Referring to FIG. 4, a second embodiment of the apparatus of the present invention, in the form of an internal tree cap 450, is shown in place within the central bore of a spool tree. The spool tree 4 is of similar design to that shown in FIG. 1, with features common to FIGS. 1 and 4 being indicated by the same reference numerals.

The internal tree cap 450 has many features in common with the internal tree cap 50 of FIG. 1, indicated by use of the same reference numerals. For a description of these features and their function, reference is made to the description above in relation to FIG. 1. The internal tree cap 450 differs from the embodiment shown in FIG. 1 in that it is landed directly on the shoulder 8 within the central bore 6 of the spool tree 4. The housing 452 of the internal tree cap 450 is formed with a lower end portion 454 shaped to seat directly on the shoulder 8. In this embodiment, once the internal tree cap 450 is landed within the spool tree 4 on the shoulder 8, the upper assembly of the internal tree cap 450 engages with the locking grooves 82 formed in the inner wall of the spool tree 4 by means of the locking ring 80, as described above with reference to FIGS. 1 to 3. A pre-load is applied to the internal tree cap 450 directly between the locking grooves 82 and the shoulder 8, as described hereinbefore. In this manner, the internal tree cap 450 is secured within the central bore 6 of the spool tree 4 and relative movement between the internal tree cap and the spool tree is prevented.

The internal tree cap 450 of FIG. 4 may be disengaged and removed from the spool tree 4 in the manner described hereinbefore.

While the preferred embodiments of the present invention have been shown in the accompanying figures and described above, it is not intended that these be taken to limit the scope of the present invention and modifications thereof can be made by one skilled in the art without departing from the spirit of the present invention.

What is claimed is:

1. A retaining apparatus for use in a wellhead, the wellhead having a central bore and first and second retaining means within the bore of the wellhead, the apparatus comprising:

a housing for location within the bore of the wellhead;

a first engagement assembly for engaging with the first retaining means in the bore of the wellhead to thereby retain the housing within the bore of the wellhead;

a second engagement assembly for engaging with the second retaining means in the bore of the wellhead;

a preload assembly operable when the housing is located within the bore of the wellhead to apply a preload to the housing between the first and second retaining means, the preload assembly comprises a loading member movable so as to be brought to bear against the second engagement assembly once the second engagement assembly is engaged with the second retaining means to urge the [apparatus] *housing* toward the first retaining means within the wellhead, to thereby provide the preload;

the loading member is a loading ring movable longitudinally with respect to the housing; and, a threaded connection secures the loading ring to the housing, rotation of the loading ring with respect to the housing causing the loading ring to move longitudinally with respect to the housing.

2. The apparatus as claimed in claim 1, wherein, as the first retaining means the wellhead comprises an internal shoulder within the bore, the first engagement assembly comprising a shoulder provided on the housing for seating directly or indirectly on the [wellhead] *internal* shoulder.

3. The apparatus as claimed in claim 2, wherein the shoulder of the first engagement assembly is adapted to seat directly on a tubing hanger assembly present in the wellhead, the tubing hanger being seated directly on the internal shoulder.

4. The apparatus as claimed in claim 1, wherein, as the second retaining means the wellhead comprises a circumferential groove within the bore of the wellhead, the second engagement assembly engageable with the circumferential groove.

5. The apparatus as claimed in claim 4, further comprising an actuator movable between a first position in which the actuator is disengaged from the second engagement assembly to a second position in which the actuator is engaged with the second engagement assembly, movement of the actuator from the first position to the second position when the [apparatus] *housing* is positioned within the wellhead engaging the second engagement assembly with the circumferential groove.

6. The apparatus as claimed in claim 5, wherein the actuator comprises a collar moveable longitudinally with respect to the housing.

7. The apparatus as claimed in claim 6, wherein the collar comprises a tapered surface, movement of the collar from the second position to the first position bringing the tapered surface into contact with the second engagement assembly and thereafter urge the second engagement assembly into engagement with the circumferential groove.

8. The apparatus as claimed in claim 1, wherein the [apparatus] *housing* is an internal tree cap.

9. The apparatus as claimed in claim 8, wherein the internal tree cap is arranged to be landed within a spool tree.

10. The apparatus as claimed in claim 9, wherein the internal tree cap is arranged to be landed on a tubing hanger installed within the central bore of the spool tree.

11. A method for retaining an apparatus within the central bore of a wellhead assembly, the method comprising:

providing a first retaining means within the bore of the wellhead assembly;

providing a second retaining means within the bore of the wellhead assembly;

providing the apparatus with an engagement assembly for engaging with the second retaining means within the bore of the wellhead assembly;

positioning the apparatus within the bore of the wellhead assembly so as to be retained by the first retaining means;

engaging the engagement assembly with the second retaining means;

applying a preload to the apparatus against the second retaining means to urge the apparatus toward the first retaining means;

providing an actuator movable longitudinally within the central bore of the wellhead assembly, movement of the actuator in a first direction causing the engagement ring to move into engagement with the groove and movement of the actuator in a second direction causing the engagement ring to move out of engagement with the groove, the method comprising moving the actuator in the first direction to engage the engagement ring with the groove;

providing a loading assembly, the loading assembly being movable longitudinally within the bore of the wellhead assembly, with the apparatus positioned within the bore of the wellhead assembly and the engagement assembly engaged with the second retaining means, movement of the loading assembly in a first direction causing the loading assembly to bear against the second retaining means and urge the apparatus against the first retaining means, thereby applying the preload to the apparatus, the method comprising moving the loading assembly in the first direction to bear against the second retaining means; and, the apparatus comprises a housing, movement of the loading assembly in the first direction is obtained by rotation of the loading assembly with respect to the housing.

12. The method as claimed in claim 11, wherein the first retaining means is an internal shoulder formed within the central bore of the wellhead assembly.

13. The method as claimed in claim 12, wherein the apparatus is landed directly on the internal shoulder within the central bore of the wellhead.

14. The method as claimed in claim 11, the method further comprising:

landing a wellhead component within the central bore of the wellhead assembly so as to be retained by the first retaining means;

the apparatus thereafter being landed on the wellhead component.

15. The method as claimed in claim 14, wherein the wellhead component is a tubing hanger.

16. The method as claimed in claim 11, wherein the second retaining means within the bore of the wellhead assembly comprises a circumferential groove, the apparatus being provided with an engagement ring movable radially into and out of engagement with the circumferential groove once the apparatus is positioned within the central bore of the wellhead assembly.

17. The method as claimed in claim 11, wherein the apparatus is an internal tree cap.

18. An internal tree cap for installation in the central bore of a wellhead assembly, the wellhead assembly comprising first and second retaining means within the bore of the wellhead, the internal tree cap comprising:

a cap housing for location within the bore of the wellhead;

a first engagement assembly for engaging with the first retaining means in the bore of the wellhead to thereby retain the cap housing within the bore of the wellhead;

a second engagement assembly for engaging with the second retaining means in the bore of the wellhead;

a preload assembly operable when the cap housing is located within the bore of the wellhead, the preload assembly when operated bearing against the second retaining means to urge the cap housing towards the first retaining means, the preload assembly thereby applying a preload to the cap housing between the first and second retaining means.

19. The internal tree cap as claimed in claim 18, wherein, as the first retaining means the wellhead comprises an internal shoulder within the bore, the first engagement assembly comprising a shoulder provided on the housing for seating directly or indirectly on the [wellhead] *internal* shoulder.

20. The internal tree cap as claimed in claim 19, wherein the shoulder of the first engagement assembly is adapted to seat directly on a tubing hanger assembly present in the wellhead, the tubing hanger being seated directly on the internal shoulder.

21. The internal tree cap as claimed in claim 18, wherein, as the second retaining means the wellhead comprises a circumferential groove within the bore of the wellhead, the second engagement assembly comprising a locking ring engageable with the circumferential groove.

22. The internal tree cap as claimed in claim 21, further comprising an actuator movable between a first position in which the actuator is disengaged from the locking ring to a second position in which the actuator is engaged with the locking ring, movement of the actuator from the first position to the second position when the [apparatus] *cap housing* is positioned within the wellhead engaging the locking ring with the circumferential groove.

23. The internal tree cap as claimed in claim 22, wherein the actuator comprises a collar moveable longitudinally with respect to the housing.

24. The internal tree cap as claimed in claim 23, wherein the collar comprises a tapered surface, movement of the collar from the second position to the first position bringing the tapered surface into contact with the locking ring and thereafter urge the locking ring into engagement with the circumferential groove.

25. The internal tree cap as claimed in claim 18, wherein the preload assembly comprises a loading member movable so as to be brought to bear against the second engagement assembly once the second engagement assembly is engaged with the second retaining means to urge the [apparatus] *cap housing* toward the first retaining means within the wellhead, to thereby provide the preload.

26. The internal tree cap as claimed in claim 25, wherein the loading member is a loading ring movable longitudinally with respect to the housing.

27. The internal tree cap as claimed in claim 26, wherein a threaded connection secures the loading ring to the housing, rotation of the loading ring with respect to the housing causing the loading ring to move longitudinally with respect to the housing.

28. A wellhead assembly comprising:

first and second retaining means within the bore of the wellhead;

an internal tree cap retained in the bore of the wellhead, the internal tree cap comprising:

a cap housing for location within the bore of the wellhead;

a first engagement assembly for engaging with the first retaining means in the bore of the wellhead to thereby retain the cap housing within the bore of the wellhead;

a second engagement assembly for engaging with the second retaining means in the bore of the wellhead;

a preload assembly operable when the cap housing is located within the bore of the wellhead, the preload assembly when operated bearing against the second retaining means to urge the cap housing towards the first retaining means, the preload assembly thereby applying a preload to the cap housing between the first and second retaining means.

29. The wellhead assembly as claimed in claim 28, further comprising a spool tree, the internal tree cap being retained in the central bore of the spool tree.

30. The wellhead assembly as claimed in claim 28, further comprising a tubing hanger, the tubing hanger being retained in the bore of the wellhead assembly by the first retaining means, the first engagement assembly of the internal tree cap engaging with the tubing hanger to retain the internal tree cap within the bore of the wellhead assembly.

*31. An apparatus for use in a wellhead, the wellhead having a central bore and first and second retaining means within the bore of the wellhead, the apparatus comprising:*

*a housing for location within the bore of the wellhead;*

*at least one seal mounted externally on a portion of the housing and adapted for sealing engagement with the wellhead;*

*a first engagement assembly associated with the first retaining means in the bore of the wellhead to thereby support the housing within the bore of the wellhead;*

*a second engagement assembly for engaging with the second retaining means in the bore of the wellhead to thereby retain the housing within the bore of the wellhead;*

*a preload assembly operable when the housing is located within the bore of the wellhead to apply a preload to that portion of the housing on which the at least one seal is mounted below the second retaining means, the preload assembly comprises a loading member movable so as to be brought to bear against the second engagement assembly once the second engagement assembly is engaged with the second retaining means to urge the housing toward the first retaining means within the wellhead, to thereby provide the preload;*

*the loading member is a loading ring movable longitudinally with respect to the housing; and,*

*a threaded connection secures the loading ring to the housing, rotation of the loading ring with respect to the housing causing the loading ring to move longitudinally with respect to the housing.*

*32. The apparatus as claimed in claim 31 wherein the loading member is movable in the first direction so as to be brought to bear against the second engagement assembly after the second engagement assembly is engaged with the second retaining means to urge the housing in the second direction opposite the first direction and toward the first retaining means within the wellhead and to secure the loading member to the housing to thereby provide and maintain the preload on the housing portion.*

*33. The apparatus as claimed in claim 31 wherein the preload on the housing prevents relative longitudinal movement of the housing portion between the housing portion and wellhead.*

*34. The apparatus as claimed in claim 31 wherein the housing is an internal tree cap.*

*35. The apparatus as claimed in claim 31 further including a bore through the housing having a profile adapted for a plug.*

*36. The apparatus as claimed in claim 35 wherein the bore includes a upwardly facing shoulder.*

*37. The apparatus as claimed in claim 31, wherein the housing has a downwardly facing shoulder adapted for engagement with a tubing hanger having seals engaging the wellhead.*

*38. The apparatus as claimed in claim 31, wherein the housing includes a downwardly extending portion adapted for insertion into a tubing hanger.*

*39. The apparatus as claimed in claim 31 wherein the housing is a tubing hanger.*

*40. The apparatus as claimed in claim 31, further comprising:*

*a well component within the central bore adapted to be supported within the wellhead;*

*seals disposed around a part of the well component and engaging the wellhead;*

*the well component supporting the housing within the wellhead;*

*the second engagement assembly including a locking ring disposed on the housing and to project into a groove of the second retaining means in the wellhead to thereby retain the housing within the central bore of the wellhead;*

*the loading member movable longitudinally with respect to the housing so as to be brought to bear against the locking ring to urge the housing against the well component to thereby provide a force to the housing.*

*41. The apparatus as claimed in claim 40 wherein loading member applies a force through the housing to that part of the well component on which the seals are disposed.*

*42. The apparatus as claimed in claim 40 wherein the well component is a tubing hanger having a bore therethrough with a profile adapted for a plug.*

*43. The apparatus as claimed in claim 40 wherein the first retaining means includes the wellhead component.*

*44. The apparatus as claimed in claim 31 wherein the second engagement assembly includes an expandable locking member.*

*45. The apparatus as claimed in claim 31 wherein the second engagement assembly and force assembly include engaging tapers camming the second engagement assembly against a downwardly facing taper on a profile of the second retaining means in the wellhead and causing a downward force.*

*46. The apparatus as claimed in claim 31 wherein the wellhead assembly includes a horizontal tree and a tubing hanger, the horizontal tree and tubing hanger having aligned lateral production ports, the seals engaging the horizontal tree and tubing hanger.*

*47. The apparatus as claimed in claim 31 wherein:*

*the housing has a neck;*

*the second engaging means includes a locking ring disposed around the neck;*

*the preload assembly including an actuator ring disposed between the neck and the locking ring;*

*the locking ring and the actuator ring having engaging tapered surfaces;*

*the actuator ring being movable longitudinally to cam the engaging tapered surfaces and apply a force to the housing; and*

*interengaging surfaces on the neck and the actuator ring engaging to maintain the housing in position as the actuator ring moves longitudinally.*

*48. A retaining apparatus for use in a wellhead, the wellhead having a central bore and a first retaining means with a support shoulder in the central bore and a second retaining means with a groove, the apparatus comprising:*

*a well component within the central bore adapted to be supported by the support shoulder;*

*seals disposed around a part of the well component and engaging the wellhead;*

*a housing adapted for location within the bore of the wellhead;*

*at least one seal mounted externally on a portion of the housing and adapted for sealing engagement with the wellhead;*

*the housing engaging the well component;*

*a first engagement assembly associated with the support shoulder of the first retaining means in the bore of the wellhead to thereby support the housing within the bore of the wellhead;*

*a second engagement assembly for engaging with the groove of the second retaining means in the bore of the wellhead to thereby retain the housing within the bore of the wellhead;*

*the second engagement assembly including a locking ring disposed on the housing and adapted to project into the groove to thereby retain the housing within the bore of the wellhead;*

*a preload assembly operable when the housing is located within the bore of the wellhead to apply a preload to that portion of the housing on which the at least one seal is mounted below the second retaining means, the preload assembly comprises a loading member movable so as to be brought to bear against the second engagement assembly once the second engagement assembly is engaged with the second retaining means to urge the housing toward the first retaining means within the wellhead, to thereby provide the preload;*

*the loading member is a loading ring movable longitudinally with respect to the housing;*

*a threaded connection secures the loading ring to the housing, rotation of the loading ring with respect to the housing causing the loading ring to move longitudinally with respect to the housing; and*

*a retainer securing the loading member to the housing as the loading member moves longitudinally.*

*49. The retaining apparatus of claim 48 wherein the loading member applies a force through the housing portion to the well component part.*

*50. An internal tree cap for installation in the central bore of a horizontal tree with a tubing hanger, the horizontal tree comprising a retaining profile within the bore of the horizontal tree, and the tubing hanger having seals around a part of the tubing hanger, the internal tree cap comprising:*

*a cap housing for location within the bore of the horizontal tree;*

*at least one seal mounted externally on a portion of the cap housing and adapted for sealing engagement with the horizontal tree;*

*the cap housing engaging the tubing hanger in the bore of the horizontal tree to thereby support the cap housing within the bore of the horizontal tree;*

*an engagement assembly on the internal tree cap engaging the retaining profile in the bore of the horizontal tree; and*

*a force assembly operable when the cap housing is located within the bore of the horizontal tree, the force assembly when operated bearing against the engagement assembly to urge the cap housing towards the tubing hanger, the force assembly thereby applying a force on the cap housing portion between the retaining profile and the tubing hanger.*

*51. The internal tree cap of claim 50 wherein the force assembly applies a force on the housing and tubing hanger which prevents relative longitudinal movement between the wellhead, housing portion and tubing hanger part.*

*52. The internal tree cap of claim 50 wherein the engagement assembly includes an expandable locking member.*

*53. The internal tree cap of claim 50 wherein the engagement assembly and force assembly include engaging tapers camming the engagement assembly against a downwardly facing taper on the retaining profile and causing a downward force on the cap housing.*

*54. A wellhead assembly comprising:*

*first and second retainers within the bore of the wellhead assembly;*

*an internal tree cap retained in the bore of the wellhead assembly, the internal tree cap comprising:*

*a cap housing for location within the bore of the wellhead assembly;*

*at least one seal mounted externally on a portion of the cap housing;*

*a first engagement assembly supported by the first retainer in the bore of the wellhead assembly;*

*a second engagement assembly for engaging the second retainer in the bore of the wellhead assembly to thereby retain the cap housing within the bore of the wellhead assembly;*

*a preload assembly operable when the cap housing is located within the bore of the wellhead assembly, the preload assembly when operated moving axially bearing against the second engagement assembly and engaging the cap housing to urge the cap housing portion in an axial direction away from the second engagement assembly and against the first retainer, the preload assembly thereby applying a preload to the cap housing portion between the first and second retainers.*

*55. The wellhead of claim 54 wherein the wellhead assembly includes a tubing hanger, which serves as the second retainer.*

*56. The wellhead assembly of claim 55 wherein the wellhead assembly includes a horizontal tree and a tubing hanger, the horizontal tree and tubing hanger having aligned lateral production ports with seals around an external part of the tubing hanger.*

*57. A wellhead assembly having a wellhead, the wellhead assembly comprising:*

*a horizontal tree having a central bore therethrough, a landing shoulder, and first and second profiles in the central bore;*

*a tubing hanger landed on the landing shoulder and having seals disposed around a part of the tubing hanger;*

*a first locking ring on the tubing hanger projecting into the first profile retaining the tubing hanger within the central bore;*

*an internal tree cap disposed within central bore and engaging the tubing hanger;*

*at least one seal mounted around an external portion of the internal tree cap;*

*a second locking ring on the internal tree cap projecting into the second profile retaining the internal tree cap within the central bore; and*

*a loading member engaging the internal tree cap and movable longitudinally with respect to the internal tree cap causing a downward force on the tubing hanger to prevent longitudinal movement of the tubing hanger part.*

*58. A wellhead assembly comprising:*

*a spool tree having a bore with first and second retaining means;*

*an internal tree cap retained in the bore of the spool tree, the internal tree cap comprising:*

*a cap housing for location within the bore of the spool tree;*

*at least one seal mounted externally around a portion of the cap housing;*

*a first engagement assembly associated with the first retaining means in the bore of the spool tree to thereby support the cap housing within the bore of the spool tree;*

*a second engagement assembly for engaging with the second retaining means in the bore of the spool tree to retain the cap housing within the bore of the spool tree;*

*a force assembly operable when the cap housing is located within the bore of the spool tree and including a securing means, the force assembly when operated bearing against the second retaining means to urge the cap housing portion towards the first retaining means, the force assembly thereby applying a force to the cap housing portion between the first and second retaining means;*

*wherein:*

*the spool tree is a horizontal tree having the bore therethrough and including a landing shoulder disposed in the bore of the horizontal tree and first and second profiles in a wall forming the bore of the spool tree;*

*a tubing hanger landed on the landing shoulder, the landing shoulder and tubing hanger forming the first retaining means;*

*seals disposed around an external part of the tubing hanger;*

*a first locking ring on the tubing hanger projecting into the first profile retaining the tubing hanger within the bore;*

*the internal tree cap having a downwardly facing shoulder forming the first engagement means and engaging the tubing hanger supported on the landing shoulder;*

*the second engagement means including a second locking ring on the internal tree cap projecting into the second profile forming the second retaining means to retain the internal tree cap within the bore; and*

*a loading member engaging the internal tree cap and movable longitudinally with respect to the internal tree cap causing a downward force on the internal tree cap portion and tubing hanger part to thereby prevent the cap housing portion and tubing hanger part from moving longitudinally with respect to the spool tree.*

* * * * *